(12) United States Patent
Meinhard et al.

(10) Patent No.: US 7,493,997 B2
(45) Date of Patent: Feb. 24, 2009

(54) DRIVE TRAIN

(75) Inventors: Rolf Meinhard, Buehl (DE); Matthias Schneider, Kilstett (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 12/069,697

(22) Filed: Feb. 12, 2008

(65) Prior Publication Data
US 2008/0202883 A1 Aug. 28, 2008

Related U.S. Application Data

(63) Continuation of application No. 10/847,748, filed on May 18, 2004, now abandoned.

(30) Foreign Application Priority Data

May 20, 2003 (DE) ............................. 103 22 618
Jun. 13, 2003 (DE) ............................. 103 26 599

(51) Int. Cl.
*B60K 17/02* (2006.01)
*F16D 13/58* (2006.01)
(52) U.S. Cl. ..................... 192/30 V; 192/115
(58) Field of Classification Search ........... 192/30 V, 192/115
See application file for complete search history.

(56) References Cited

U.S. PATENT DOCUMENTS

| 4,871,342 A | * | 10/1989 | Boss et al. ............... 464/98 |
| 5,588,517 A | | 12/1996 | Kooy et al. .............. 192/70.25 |
| 6,131,486 A | * | 10/2000 | Doman .................... 74/572.21 |
| 6,634,477 B2 | * | 10/2003 | Beneton et al. ........... 192/48.8 |
| 6,668,994 B2 | * | 12/2003 | Hirt ......................... 192/48.8 |
| 6,722,483 B2 | * | 4/2004 | Damm et al. .............. 192/48.8 |
| 6,830,139 B2 | * | 12/2004 | Carlson et al. ............ 192/48.8 |
| 2002/0065171 A1 | | 5/2002 | Raber ........................ 477/175 |

FOREIGN PATENT DOCUMENTS

| DE | 28 30 659 | 1/1979 |
| DE | 100 33 649 | 2/2001 |
| DE | 103 13 739 | 10/2003 |
| DE | 44 31 641 | 3/2004 |
| FR | 000 8975 | 1/2001 |
| GB | 2 387 209 | 10/2003 |
| GB | 2 392 967 | 3/2004 |
| WO | WO 00/15971 | 3/2000 |
| WO | WO 01/03984 | 1/2001 |

* cited by examiner

Primary Examiner—Richard M. Lorence
(74) Attorney, Agent, or Firm—Davidson, Davidson & Kappel, LLC

(57) ABSTRACT

A drive train having a clutch assembly for transmitting torque between an engine and a transmission. The clutch assembly is selectable for transmitting torque between the engine and the transmission and includes at least one friction clutch, the clutch assembly being supported on the transmission housing so that the clutch assembly is radially fixed and displaceable in an axially limited manner.

12 Claims, 3 Drawing Sheets

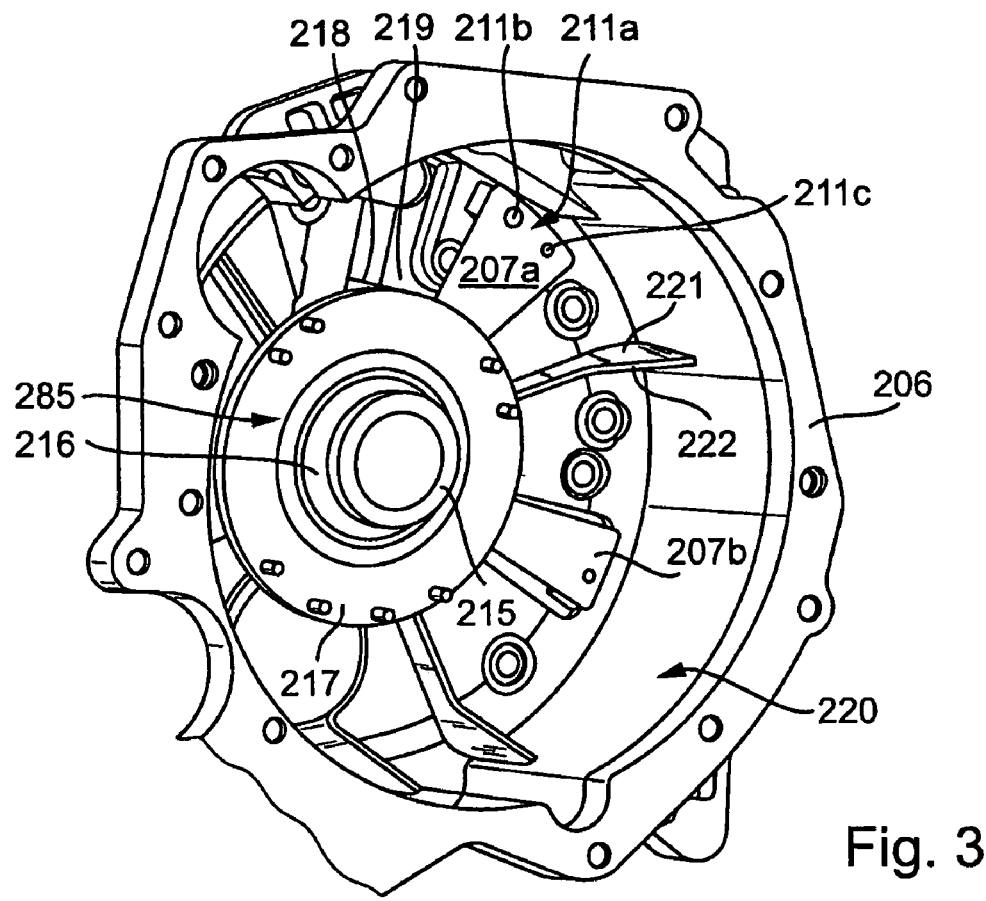
Fig. 3
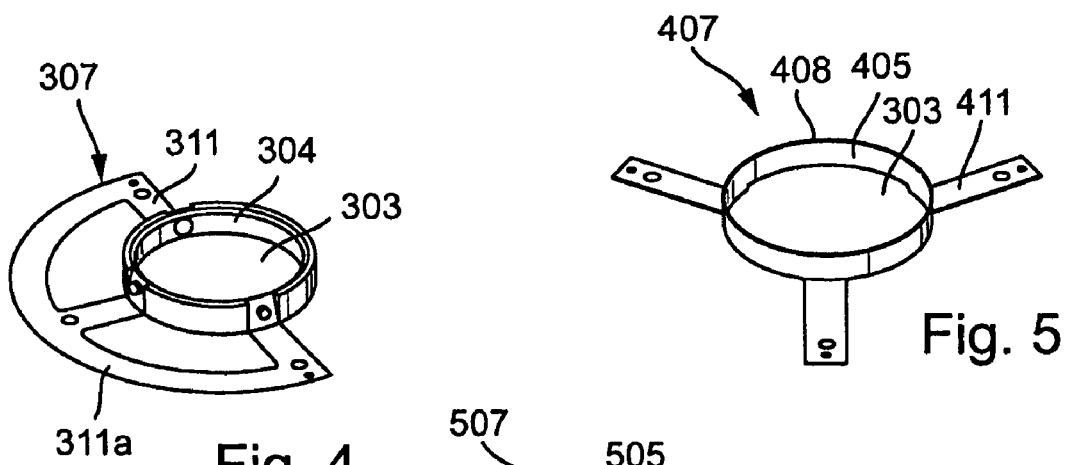
Fig. 4
Fig. 5
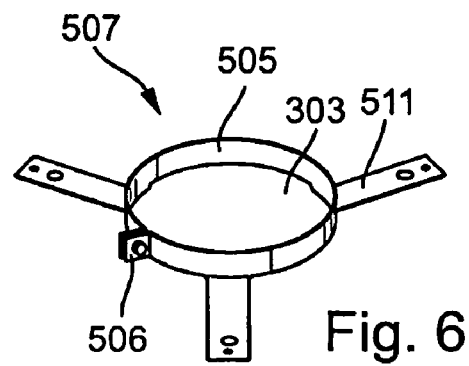
Fig. 6

DRIVE TRAIN

CROSS REFERENCE TO RELATED APPLICATIONS

This application is a continuation of U.S. patent application Ser. No. 10/847,748, filed on May 18, 2004, now abandoned which claims priority to German Patent Application Nos. 103 22 618.4 and 10326599.6, both of which are hereby incorporated by reference herein.

The present invention is directed to a drive train having a clutch assembly for transmitting torque between an engine and a transmission. The present invention is directed, in particular, to such clutch assemblies which include at least one friction clutch for connecting and disconnecting the engine and the transmission to and from one another in terms of drive operation.

BACKGROUND

Clutch assemblies having two friction clutches are known, for example, from the German Application DE 28 30 659 A1, hereby incorporated by reference herein. However, such clutch assemblies have a very complex and expensive design, which also necessitates a very complex actuating system. Typically, these types of clutch assemblies are built to be very long axially, so that the dimensional design of the crankshafts, which accommodate these assemblies, must be calculated accordingly. In addition, the axial vibrations and wobble produced by the crankshaft are transmitted to the transmission and to the actuating mechanism, so that manifestations of wear and loss of comfort occur.

SUMMARY OF THE INVENTION

An object of the present invention is to devise a drive train of the type mentioned at the outset in a way that will improve its operation and simplify its design, and ensure a cost-effective manufacturing. In addition or alternatively, the operation of the drive train according to the present invention should be especially simple, thereby enabling the use of an economically priced actuating system. It is also additionally or alternatively intended, by the special form and mode of operation of a clutch assembly designed in accordance with the present invention, to improve or optimize its installation between the engine and transmission, and/or to isolate the axial vibrations and wobble originating in the engine.

The present invention provides that the clutch assembly of the drive train is not only accommodated at the crankshaft itself, but also at the transmission housing in a way that permits rotational twisting.

In an especially advantageous manner, the present invention may be utilized for a drive train having a twin clutch.

In this context, the twin clutch may have two clutch disks, which are each connectible to a transmission input shaft. The transmission may advantageously form a so-called power-shift transmission. However, one of the clutches may also be used for a power take-off, via which auxiliary units may be driven, for example.

In an especially beneficial manner, the clutch unit may be engageable and disengageable via an actuating mechanism integrated in the clutch unit. In this context, the actuating mechanism may be positioned or supported in the clutch unit in such a way that the clutch-actuating or clutch-engaging forces are absorbed within the clutch unit; thus, this means that the components forming the clutch unit support the actuating mechanism in such a way that the power flow generated by these forces within these components forms a closed circuit.

The actuating mechanism may be supported quite advantageously via a bearing on a cover of the clutch unit. This bearing or bearing assembly enables the actuating mechanism to be positioned both axially, as well as radially within the clutch unit. By using such a design, at least one component of the actuating mechanism may also be used for the transmission-side, centered preassembly of the clutch unit. This component may advantageously be constituted of a non-rotatable component of the actuating mechanism.

To support the centrical mounting support of the clutch unit on the transmission side, at least one clutch disk of the clutch unit may be centrically held in a precentered position within the friction clutch in question, so that when preassembling the partial module in question on the transmission side, at least one centering support may be ensured via the hub of the clutch disk that is slideable onto a transmission input shaft.

In an especially beneficial manner, the clutch assembly may form a so-called dual-mass system, the two masses being coupled in a torsionally flexible manner via the torsional-vibration damper. In this context, the components of the torsional vibration damper that are connectible to the engine's output shaft may form at least one part of a primary mass.

It may be especially beneficial for the operation of the clutch unit for at least one of the friction clutches making up the unit to be designed as a self-adjusting friction clutch.

If the clutch unit is constituted of a twin clutch, it may be practical for both clutches to be engageable by force, i.e., when the clamping load required for transmitting torque is applied to the individual friction clutches via the actuating system. However, for many application cases, it may also be practical for at least one or even both friction clutches to be designed to include an energy-storage mechanism—such as a diaphragm spring—which applies the clamping load required for transmitting torque, at least partially, preferably completely. If the energy-storage mechanism applies only one portion of the required clamping load, the additional portion of the clamping load necessary for a slip-free torque transmission must be applied via the actuating system of the corresponding clutch. In this context, the clutches may be designed as pulled or pressed clutches. A combination of two different clutch types is also possible. Thus, for example, within the clutch unit, a pulled and a pressed clutch may be used. Moreover, the actuating systems acting on the release device, such as the diaphragm-spring fingers, may be designed to be able to exert a force on these release device in the engagement direction, as well as in the disengagement direction of the corresponding friction clutch.

The connection provided between the non-rotating component of the actuating mechanism and the transmission housing may advantageously be a first disk part, which may have an axially flexible design to compensate for axial vibrations and/or wobble. Together with a second, axially flexible disk part, which accommodates the clutch assembly on the engine side, this first disk part may form a damping unit, the rigidity of both disk parts being adapted to one another. It turns out that it may be particularly advantageous for the axial rigidity of the second disk part to be greater than that of the first disk part.

Another inventive idea provides for the first disk part to be designed to allow the clutch assembly to be altogether substantially neutrally supported in such a way that, at locations where the transmission housing wall has axial elevations, for example at the bearing eyes of the transmission input shaft and of the transmission output shaft, the first disk part may have cut-outs, enabling it to be penetrated by the axial elevations.

It may be particularly advantageous for the first disk part to be fastened in its circumferential area, to provide an optimal radius for an axial flexibility between the points of connection of the clutch assembly and of the transmission housing. In addition, the fastening operation may be carried out radially externally on the transmission housing, in areas where a fastening is easily accessible from the outside.

To facilitate simple installation of the engine, together with the clutch assembly and the transmission, the actuating device, for example the first disk part, may have positioning means for fixing the torsional position between the disk part and the transmission housing before and/or during assembly of the engine housing and transmission housing.

The actuating mechanism may be a mechanically or electrically, externally actuated lever mechanism or ramp mechanism, which, via tensile or rotary motion, executes a reciprocating motion directed axially along the transmission input shaft to actuate one or more clutches. In this regard, the Patent Applications DE 103 13 739, related to GB Patent Application Nos. 2387209 and 2392967, WO00/15971 and DE 44 31 641, related to U.S. Pat. No. 5,588,517, are mentioned, for example, all six of which are hereby incorporated by reference herein.

In addition, the actuating mechanism may be a slave cylinder, which is mounted concentrically around the transmission input shaft and includes one or more annular cylinders disposed radially over one another, for example. Alternatively to or in combination with hydraulically actuated annular cylinders or via externally actuated release units, piston/cylinder units may be provided, which are distributed around the circumference of the transmission input shaft and which, in the case of two clutches, may be positioned on the same or different radius.

Another alternative to or possible combination with the above-mentioned actuating mechanism may be an electrically actuated release mechanism, which is disposed concentrically around the transmission input shaft and is accommodated in the clutch bell housing, preferably concentrically around the transmission input shaft. In this regard, the exemplary embodiments of the Patent Application WO01/03984, related to U.S. Patent Publication No. 2002/065171, both of which are hereby incorporated by reference herein, as well as generally known spindle drives are mentioned.

BRIEF DESCRIPTION OF THE DRAWINGS

Other advantages with regard to both the operation, as well as the design of a clutch assembly according to the present invention are explained in greater detail in the following description of the figures, in which:

FIG. 3 shows a three-dimensional sketch showing the layout of one specific embodiment of an actuating system, including an axially flexible disk part; and FIGS. 4, 5 and 6 show various exemplary embodiments including an axially flexible disk part which is able to be fastened to the actuating system via a sliding fit or clamping fit.

DETAILED DESCRIPTION

Figure 1:
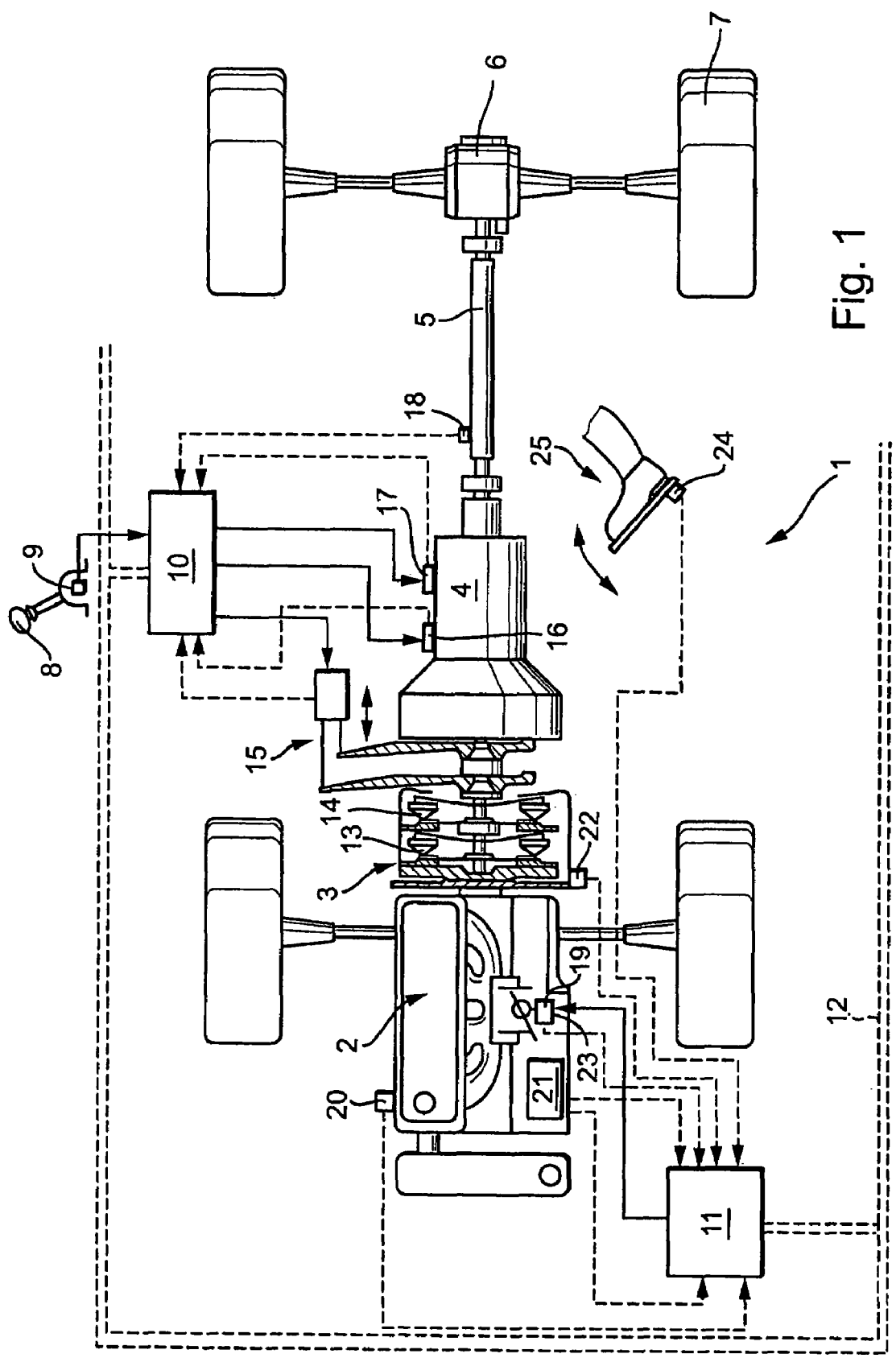
FIG. 1 shows a schematic representation of a motor vehicle including a driving engine, clutch assembly, transmission, downstream drive train, as well as a regulating or control device.

FIG. 1 schematically depicts a motor vehicle 1 having a drive train, including a driving engine 2 designed as a combustion engine, a clutch assembly 3, and a transmission 4. Wheels 7 of vehicle 1 are driven via a drive shaft 5 and a differential gear 6. It may, of course, correspondingly concern a vehicle having one or more different driven axles.

A gear-ratio selector 8, such as selector lever having sensor 9, and a control device 10, 11 are illustrated in a block diagram. Control device 10, 11 may be designed as a unit or in structurally and/or functionally separate sections. If control device 10, 11 is designed in structurally and/or functionally separate sections, these may be interconnected, for example, via a CAN-bus 12 or another electrical connection for exchanging data. Control device 10, 11 controls, for example, the automated actuation of transmission 4 and/or clutches 13, 14 belonging to clutch assembly 3, or engine 2, for example the engine torque, the gear ratio selection, a park position or a neutral position of transmission 4, or the torque that is transmittable from clutches 13, 14.

Clutches 13, 14 are preferably actuable in automated fashion by an actuator 15, clutches 13, 14 being actuable independently of one another. Actuator 15 for actuating clutches 13, 14 may be designed in a structural and/or functional unit or in sections assigned, for example, to individual clutches 13, 14.

The device for changing the transmission ratio includes at least transmission-actuating devices 16, 17, it being possible for each of transmission-actuating devices 16, 17 to be provided for actuating a group of gear ratios, each of which is assigned to one of clutches 13, 14.

In particular, the groups of gear ratios may be formed in such a way that, with respect to their ratios, the gear ratios form a sequence, enabling adjacent gear ratios to each be assigned to different clutches 13, 14. Thus, clutch assembly 3 renders possible an actuation of clutches 13, 14 required for a powershift operation, in the transition to a gear shift operation characterized by little or no interruption of tractive power.

The ratio of transmission 4 may be changed by a triggering of actuating devices 16, 17. Actuating devices 16, 17 may include, for example, two drives each for generating a shifting or selecting motion.

Clutch assembly 3 is also actuable in automated fashion by control device 10, 11 via actuator 15.

Control device 10, 11 receives signals, which at least represent the transmission state of clutches 13 and/or 14 and the transmission ratios adjusted in transmission 4, as well as, if necessary, signals from a sensor 18 for the output speed and from a sensor 9 at gear-ratio selector 8. These signals are sensed by sensors, such as by a gear-detection sensor or by a clutch-control travel sensor.

Section 11 of the control device controls combustion engine 2 by adjusting the throttle valve and/or injection 19. Signals are received from sensors 20 for intake-manifold pressure 21, for coolant temperature 22, for engine speed 23, for throttle-valve position or injection 19 and 24, and for an accelerator-pedal actuation 25. The present invention may, of course, be correspondingly used with all types of driving engines.

Transmission-actuating devices 16, 17 include two electromotors each, for example, a first electromotor being driven for actuating the selection process, and a second electromotor for actuating the shifting operation. To this end, an adjusting device of at least one transmission-side switching element is actuated by the electromotors along the selection or shifting path.

Figure 2:
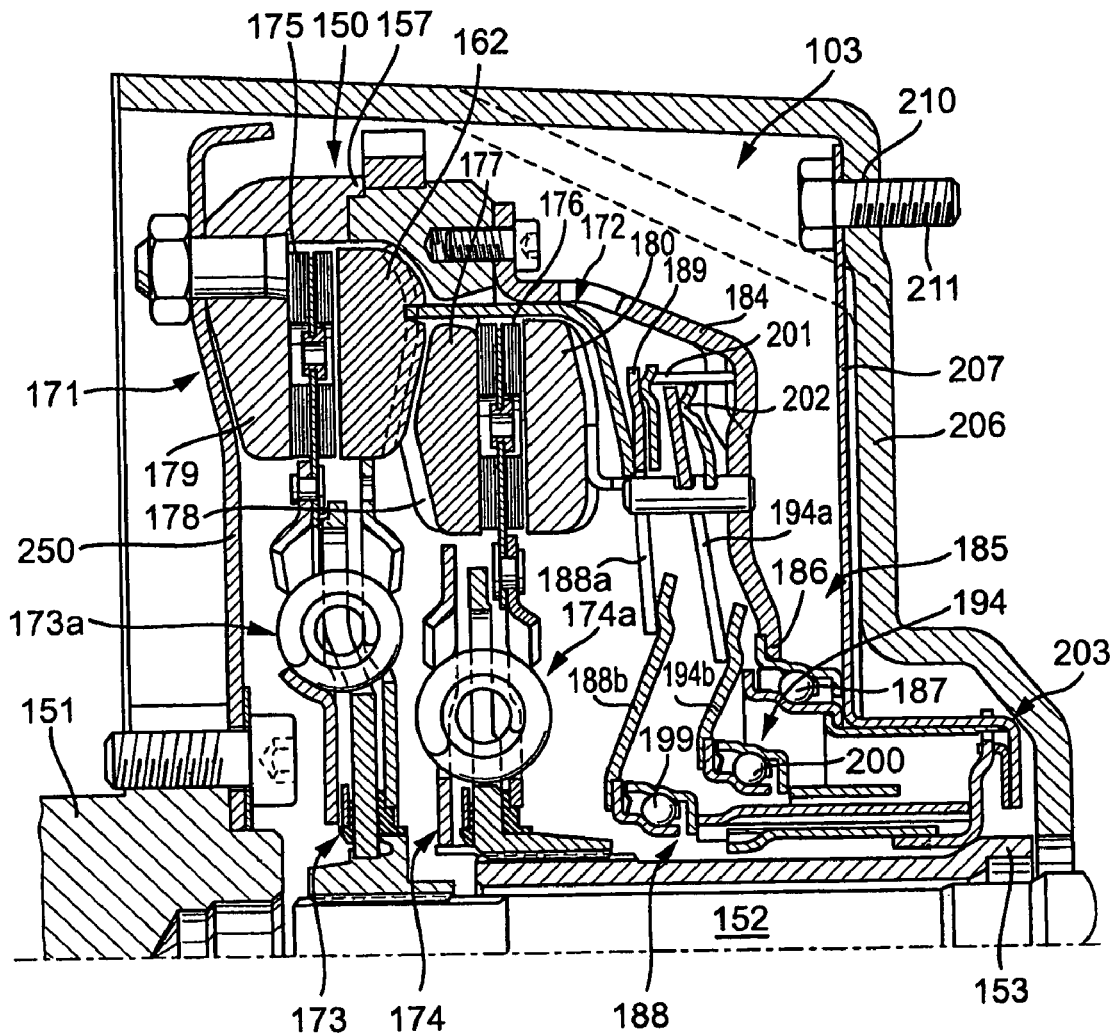
FIG. 2 shows a clutch assembly designed for installation between the engine and transmission.

Clutch assembly 103 illustrated in FIG. 2 includes a clutch unit having a twin clutch 150, which is able to connect a driving shaft, such as, in particular, crankshaft 151 of an internal combustion engine, to two drivable shafts, such as, in particular, transmission input shafts 152, 153, and disconnect it therefrom. Twin clutch 150 may be connected via a vibration damper, such as by a dual-mass flywheel, to the engine. In the illustrated exemplary embodiment, however, it is rigidly accommodated in the circumferential direction on the crankshaft, axially flexibly via disk part 250. Disk part 250 is permanently fixed via radially inner regions to crankshaft 151—here via screws, and is formed by a shaped sheet metal part, which supports flywheel mass 157 radially on the outside.

The clutch unit or twin clutch 150 has two friction clutches 171, 172, which each include a clutch disk 173, 174 having integrated torsional vibration dampers 173a, 174a, which at least substantially filter the torsional vibrations introduced by the engine, so that these vibrations are at least not completely transmitted to transmission shafts 152, 153. Clutch disk 173 is accommodated on inner shaft 152 and clutch disk 174 on hollow, external, coaxially running shaft 153. Radially on the outside, clutch disks 173, 174 have frictional regions, which, in the illustrated exemplary embodiment, are constituted of annular friction linings 175, 176. Annular component 162 forming a pressure plate for friction clutch 171 is joined to a further annular component 177, which forms the counterpressure plate for friction clutch 172. Pressure plate 162 and counterpressure plate 177 are joined to one another with rotational locking via interlocking, gear-tooth regions 178. Friction clutch 172 has a pressure plate 180; counterpressure plate 179 of friction clutch 171 is formed by flywheel mass 157.

Flywheel mass 157 is permanently fixed to clutch housing 184, which, in this case, is made of sheet metal. At the same time, clutch housing 184 is used for centering an actuating mechanism 185, via which the two friction clutches 171, 172 are selectively actuable. To center actuating mechanism 185, on the transmission side, clutch housing 184 has a receiving seat in the form of an annular projection 186, which holds a bearing 187 that centers or supports release mechanism 185 with respect to clutch assembly 103.

Friction clutch 171 is actuated or pressure plate 162 is axially displaced via an actuating device 188, which acts on a bracing element 188a, which keeps friction clutch disengaged by force and engages clutch 171 in response to actuation of actuating device 188.

Friction clutch 172 is actuable via actuating device 194, which, in the illustrated exemplary embodiment, act on bracing element 194a. In the illustrated exemplary embodiment, both friction clutches 171, 172 are designed to engage by force via actuating devices 188, 194. Thus, the axial forces required for engaging friction clutches 171, 172 are applied via actuating mechanism 185. This actuating mechanism 185 encompasses both actuating devices 188, 194, which, in the illustrated exemplary embodiment, are positioned coaxially, and may be at least partially axially nested in one another. These actuating devices each include an axially displaceable release bearing 199, 200 respectively. Release bearings 199, 200 have a rotatable ring, which acts axially on the particular assigned fingertips of bracing elements 188a and 194a via lever elements 188b, 194b, in order to apply the clamping loads required for the torque to be transmitted, to pressure plates 162, 180.

Actuating mechanism 185 may have two piston/cylinder units, which are nested in one another and may preferably be acted upon hydraulically and/or also pneumatically. In this context, both cylinders may have a common housing part. However, the design of the actuating mechanism may also be such that at least one of the actuating devices is an electromechanical actuator. With regard to the design and method of functioning of such an electromechanical actuator, reference is made, in particular, to the German Patent Application 100 33 649 and, respectively, to the related French Patent Application 0008975 and U.S. Patent Publication No. 2002/065171 A1, all of which are hereby incorporated by reference herein. The principle of converting a rotational motion into an axial motion using an axially wound-up band, as described in these applications, may advantageously be applied to actuating unit 197 and/or 198. Particularly in conjunction with FIG. 19 of these applications, an actuating mechanism or an actuating device 1120 is described, which has two actuating units 1120a and 1120b, which are coaxially disposed and at least partially axially nested in one another. The content of these applications in this regard should likewise be considered as being integrated in the present application, so that there is no need to describe the design and method of functioning of such actuating mechanisms in greater detail in the present application.

Between bracing elements 188a, 194a and clutch housing 184, adjusting devices 201, 202 are provided, which at least partially compensate for the manifestations of wear occurring on friction linings 175, 176. However, it may also be especially beneficial for many application cases when no adjusting devices of this kind are provided, or, however, when only one of the two clutches 171, 172 has such an adjusting device.

As may be inferred from FIG. 2, actuating mechanism 185 has a supporting component 203, which, in the illustrated exemplary embodiment, is formed from a plurality of individual sheet-metal panels. Bearing 187, which in the illustrated exemplary embodiment is constituted of an antifriction bearing in the form of a ball bearing, but which may also be a friction bearing, is situated between outer clutch housing 184 and supporting component 203 of actuating mechanism 185 in such a way that the forces exerted by the actuating units on actuating devices 188, 194 are absorbed by this bearing 187 in such a way that a closed power-flow circuit forms within clutch unit 150. This eliminates the need for the crankshaft bearing assembly having to absorb the clutch-actuating forces.

As may be also inferred from FIG. 2, between a transmission-side component 206 (for example the transmission housing) and a non-rotating component of actuating mechanism 185 (in this case housing part 203), a connection is provided, which is formed here by an axially flexible disk part 207. This disk part may be provided under preloading in the manner that twin clutch 150 is axially preloaded with a defined force in the direction of engine output shaft 151. In addition, disk part 207 may be designed in such a way with respect to its axial rigidity that, in conjunction with disk part 250, axial vibrations and/or wobble originating in the engine are effectively damped. To this end, disk part 207 advantageously exhibits less axial rigidity than does disk part 250. Besides supporting actuating mechanism 185, disk part 207 supports entire clutch assembly 103 via antifriction bearing 187, so that natural vibrations and resonant vibrations induced by the engine may be substantially prevented. Disk part 207 is secured radially outwardly to transmission housing wall 207. To this end, following assembly of the engine and transmission, disk part may be externally secured through openings 210, e.g., bolted or riveted, or disk part 207 has—as shown here—fastened threaded pins or welded-on screws 211, which penetrate the openings and are externally fixed by a locknut. For this, corresponding indentations may be provided in the flange region of transmission housing 206. To position the disk part on openings 210, provision may be made for suitable positioning means to bring crankshaft 151 into the appropriate angular position, or for a rotational twisting of the supporting part against the part carried by it, in particular in response to an actuating mechanism 185 via one or more slave cylinders, where the piston and housing are rotatable relatively to each other, along with subsequent fixing in position, in alignment with openings 210.

In this regard, FIG. 3 shows an installation situation for an actuating mechanism 285. Concentrically mounted around the transmission input shaft (not shown), is a slave cylinder for a twin clutch having two annular pistons 215, 216, which each actuate one clutch, each being actuated via one feed line 218, 219 by a master cylinder.

For the sake of simplicity, actuating mechanism 285, which is generally connected to the cover of clutch assembly (see FIG. 1) via flange 217, either by being welded on, riveted on, or otherwise mounted in a torsionally fixed and axially fixed manner, is shown without the clutch assembly. The radial support connected as a disk part or as separate wings 207a, 207b to the housing of actuating mechanism 285, is connected radially externally to transmission housing 206, thereby supporting the clutch assembly on the transmission in an axially flexible and radially fixed manner. In clutch bell housing 220, guides, such as grooves 221, may be provided, which cooperate suitably with guides 222 disposed on actuating devices 285 and are complementary thereto, and which, during assembly of the engine and transmission, center actuating mechanism 285 in such a way that the assembly is facilitated by aligning fasteners 211a between the transmission and disk part 207a, 207b. Guides 221, 222 are, of course, dependent on the type of transmission and can and must be advantageously differently designed for each transmission, using as few as possible components. In the exemplary embodiment shown in FIG. 3, fasteners 211a are constituted of screws, externally bolted through transmission housing 206, a thread and bolt 211c being provided on wings 207a, 207b, bolts 211c engaging in the transmission housing and wings 207a, 207b being able to providing a centering function during assembly and reinforce the connection during operation. In accordance with the inventive idea, screw-bolt connections, notching connections, and the like, for example, are not to be regarded as conclusively included, in the simplest case, it possibly sufficing for the disk part or disk parts or wings 207a, 207b to be fixed in the circumferential direction, for example via a plug-in connection, on the transmission housing, when an axial preloading between the disk part and transmission housing prevents the disk part from giving way axially.

FIGS. 4 through 6 each show an axially flexible disk part 307, 407, 507 having a different annular component 304, 405, 505 in each of the exemplary embodiments, whose opening 303 accommodates the actuating mechanism, on which a complementary receiving surface is formed for this purpose. In FIGS. 4 and 5, annular components 304, 405 are designed to form a sliding fit with the actuating mechanism, while the annular component has an adjustable circumference, which is tensioned by the receiving surface of the actuating mechanism, following assembly. For this purpose, device 506, corresponding in function to a hose clip, may be used, such as screws for narrowing the circumference. As shown in FIG. 5, the annular components may have suitable insertion bevels 408 for the actuating mechanism. Axially flexible disk parts 307, 407, 507 may be fabricated as single- or multi-piece parts using stamping, deep-drawing, and/or transversal extrusion methods, and the like, it possibly being beneficial to fasten wings 311 individually or via an outer ring 311a to one single component joined to ring 304, for example by riveting, welding, such as spot welding, laser welding, and the like. Wings 411, 511 may alternatively be fabricated in one piece with the annular component, it being possible to use flat material, and annular part 405, 505 being able to be premolded on, accordingly, or round material, with subsequent turning-down of wings 411, 511. Flexible disk part 307, 407, 507 is fastened externally or internally to the clutch bell housing via screw connections, riveting, or pin fastening, and connected to the actuating mechanism during assembly of the engine and transmission. This eliminates the need for aligning the angular positions between the clutch assembly, mounted on the engine side, having the flange-mounted release mechanism, and its transmission-side attachment. The alignment of wings 311, 411, 511 may advantageously be uniformly distributed over the periphery, or be irregular; the wings may be diametrically opposed to one another. In this context, the requisite axial rigidity is adjusted on the basis of the material thickness, the wing width and length, and/or by using reinforcing elements, such as ring 311a.

What is claimed is:

1. A drive train comprising:
   an engine;
   a transmission having a transmission housing;
   at least one transmission input shaft;
   a clutch assembly selectable for transmitting torque between the engine and the transmission, the clutch assembly including at least one friction clutch, the clutch assembly being supported on the transmission housing so that the clutch assembly is radially fixed and displaceable in an axially limited manner;
   an actuating mechanism integrated in the clutch assembly, the clutch assembly being engageable and disengageable via the actuating mechanism, wherein the clutch assembly is held on a transmission side via a non-rotatable component of the actuating mechanism, wherein the non-rotating component is connected on the transmission side via an axially-flexible first disk part to the transmission housing, the axially-flexible first disk secured radially to the transmission housing.

2. The drive train as recited in claim 1 wherein the actuating mechanism is integrated in the clutch assembly so that the clutch-actuating and the clutch-engaging forces are absorbed within the clutch unit so as to define a closed power-flow circuit.

3. The drive train as recited in claim 1 wherein the actuating mechanism is rotatably supported via a bearing on a clutch housing.

4. The drive train as recited in claim 1 wherein the clutch assembly is accommodated on a crankshaft of the engine via an axially-flexible, second disk part rigid in a circumferential direction, an axial rigidity of the first disk part being less than that of the second disk part.

5. The drive train as recited in claim 1 wherein the first disk part has cut-outs penetrated by axially-protruding housing regions in the transmission housing in a region of an assembly space of the first disk part.

6. The drive train as recited in claim 1 wherein the first disk part is connected radially externally to the transmission housing.

7. The drive train as recited in claim 1 wherein the first disk part has positioners for fixing the torsional position between the first disk part and the transmission housing before and/or during assembly of an engine housing and transmission housing.

8. The drive train as recited in claim 1 wherein the actuating mechanism is a mechanically, externally-actuated lever mechanism.

9. The drive train as recited in claim 1 wherein the actuating mechanism is a slave cylinder mounted concentrically around the transmission input shaft.

10. The drive train as recited in claim 1 wherein the actuating mechanism is an electrically-actuated release mechanism mounted concentrically around the transmission input shaft.

11. The drive train as recited in claim 1 wherein the actuating mechanism and the first disk part are supported on one another via a sliding fit.

12. The drive train as recited in claim 1 wherein the actuating mechanism and the first disk part are permanently fixed to one another following assembly of the engine and transmission unit.

* * * * *